United States Patent Office 2,724,685
Patented Nov. 22, 1955

2,724,685
DETHIOLIZING HYDROCARBONS

James L. Meadows, Port Arthur, Tex., assignor to The Texas Company, New York, N. Y., a corporation of Delaware No Drawing. Application August 30, 1952,
Serial No. 307,379

3 Claims. (Cl. 196—32)

This invention relates to the treatment of hydrocarbons for the removal of sulfur compounds, particularly mercaptans. The invention is directed especially to certain improvements in the treating of hydrocarbons with alkali metal hydroxides in solution with glycol ethers.

This application is a continuation-in-part of my pending application Serial Number 230,417, filed June 7, 1951, now U. S. Patent No. 2,674,567.

In the treatment of light distillates such as gasoline with aqueous alkali metal hydroxides it is possible to effect a removal of the lower molecular weight mercaptans, but the higher molecular weight mercaptans cannot be satisfactorily removed in this manner. A substantially complete removal of the mercaptans can be obtained by treating the hydrocarbon with solutions of alkali metal hydroxides in glycol ethers; but this process has the disadvantage that an impairment of color accompanies the operation. The solution of hydroxide and glycol ether becomes discolored and functions to impart a yellow or brownish color to the distillate treated. The discovery has now been made that by including certain polyalkene polyamines in the glycol ether solution of alkali metal hydroxide, this impairment in color may be inhibited while a substantially complete removal of mercaptans may be effected.

The invention contemplates the treatment of light hydrocarbon distillates such as kerosene and gasoline with an alkali metal hydroxide in an ether of a polyhydric alcohol, and in the presence of a polyalkene polyamine which is substantially insoluble in naphtha under the conditions of use. The polyalkene polyamine is preferably one wherein the alkene residue contains not more than four carbon atoms per alkene unit. In practicing the invention the major portion of the solvent in which the alkali metal hydroxide is contained consists of the glycol ether. Preferred glycol ethers are diethylene glycol monomethyl ether, commonly known as methyl Carbitol, and ethylene glycol monomethyl ether, commonly known as methyl Cellosolve.

The color inhibiting material, which, in accordance with invention, is used in the glycol ether solution of alkali metal hydroxide, is a polyalkene polyamine, such as tetraethylene pentamine, tetrapropylene pentamine and tetrabutylene pentamine, which forms a salt with the hydroxide. The color inhibiting polyalkene polyamine is effective in a relatively small proportion. While the color inhibiting function is somewhat in proportion to the amount of inhibitor used, it is found that relatively small proportions such as some two to ten per cent by volume of the treating solution are adequate to prevent any serious impairment of color.

In order to obtain a complete removal of the mercaptans the alkali metal hydroxide, such as sodium or potassium hydroxide, should be used in strong solution in the glycol ether, such as normalities of about two to three and higher. The dethiolizer solution is used in amounts of some five to ten per cent by volume of the hydrocarbon treated.

The dethiolizer solution may be used in anhydrous or aqueous solution. It is preferred, however, to use an aqueous solution when regenerating ad recycling, since it is found that the presence of water has a beneficial effect in the glycol ether dethiolizer solution in maintaining extraction efficiency for increased periods of time. The solution can tolerate about 35% by volume of water without appreciable reduction in extraction efficiency.

The salts formed from the polyalkene polyamine are relatively non-volatile, which affords an advantage in regenerating the treating solution. Thus, in air blowing for reactivating the solution, any loss of the inhibitor is reduced to a minimum.

As typical of the invention a sour gasoline was treated in a solution of caustic potash and methyl Carbitol containing 5% by volume of tetraethylene pentamine to produce a doctor sweet gasoline. The color of the treated gasoline product was greatly superior to the color of the product obtained when treating without the presence of the color inhibiting material.

Although a preferred embodiment of the invention has been described herein, it will be understood that various changes and modifications may be made therein, while securing to a greater or less extent some or all of the benefits of the invention, without departing from the spirit and scope thereof.

I claim:

1. The process of dethiolizing hydrocarbons that comprises contacting the hydrocarbons with a solution of alkali metal hydroxide in a glycol ether, selected from the group consisting of ethylene and diethylene glycol monomethyl ethers, containing a relatively small proportion of a polyalkene polyamine, substantially insoluble in naphtha under the conditions, effective to inhibit impairment in color of the hydrocarbons.

2. The process of dethiolizing hydrocarbons that comprises contacting the hydrocarbons with a solution of alkali metal hydroxide in a glycol ether, selected from the group consisting of ethylene and diethylene glycol monomethyl ethers, containing a relatively small proportion of a polyalkene polyamine having not more than four carbon atoms per alkene unit, effective to inhibit impairment in color of the hydrocarbons.

3. The process of dethiolizing hydrocarbons that comprises contacting the hydrocarbons with a solution of alkali metal hydroxide in a glycol ether, selected from the group consisting of ethylene and diethylene glycol monomethyl ethers, containing a relatively small proportion of tetraethylene pentamine effective to inhibit impairment in color of the hydrocarbons.

References Cited in the file of this patent

UNITED STATES PATENTS

| | | |
|---|---|---|
| 2,546,345 | Meadows et al. | Mar. 27, 1951 |
| 2,616,831 | Rosenwald | Nov. 4, 1952 |